US007969862B1

(12) United States Patent
Wang et al.

(10) Patent No.: US 7,969,862 B1
(45) Date of Patent: Jun. 28, 2011

(54) CYCLE-BASED RESTORATION IN MESH NETWORKS UTILIZING BANDWIDTH AND FLOW CONSIDERATIONS

(75) Inventors: Guo-Qiang Wang, Kanata (CA); Attahiru Sule Alfa, Winnipeg (CA)

(73) Assignee: Ciena Corporation, Linthicum, MD (US)

( * ) Notice: Subject to any disclaimer, the term of this patent is extended or adjusted under 35 U.S.C. 154(b) by 2446 days.

(21) Appl. No.: 10/434,868

(22) Filed: May 9, 2003

Related U.S. Application Data

(60) Provisional application No. 60/451,898, filed on Mar. 4, 2003.

(51) Int. Cl.
*H04L 1/00* (2006.01)
*H04L 12/26* (2006.01)
*H04L 12/28* (2006.01)
(52) U.S. Cl. ......... 370/216; 370/238; 370/351; 709/241
(58) Field of Classification Search .................. 370/218, 370/406; 709/241
See application file for complete search history.

(56) References Cited

U.S. PATENT DOCUMENTS

| 5,850,505 | A  | * | 12/1998 | Grover et al. ................... 714/4 |
| 6,377,543 | B1 | * | 4/2002  | Grover et al. ................. 370/227 |
| 6,914,880 | B1 | * | 7/2005  | Grover et al. ................. 370/221 |
| 6,982,951 | B2 | * | 1/2006  | Doverspike et al. .......... 370/217 |
| 7,075,892 | B2 | * | 7/2006  | Grover et al. ................. 370/238 |
| 2002/0181393 | A1 | * | 12/2002 | Grover et al. ............... 370/225 |
| 2003/0021222 | A1 | * | 1/2003 | Boer et al. .................... 370/216 |
| 2003/0035379 | A1 | * | 2/2003 | Zimmel et al. ................ 370/252 |
| 2003/0046378 | A1 | * | 3/2003 | Zimmel et al. ................ 709/223 |
| 2004/0109407 | A1 | * | 6/2004 | Grover et al. ................. 370/218 |
| 2004/0133663 | A1 | * | 7/2004 | Grover et al. ................. 709/220 |
| 2004/0190445 | A1 | * | 9/2004 | Dziong et al. ................. 370/225 |

OTHER PUBLICATIONS

J. Doucette, W. Grover, "Bi-criteria studies of mesh network restoration path-length versus capacity tradeoffs", Optical Fiber Communication Conference and Exhibit, OFC 2001, vol. 2, TuG2-2-TuG-3.*
*P-cycle Optimization Problem* (Final Report), Institute for System Programming, Russian Academy of Sciences, 2003.

* cited by examiner

*Primary Examiner* — Chirag G Shah
*Assistant Examiner* — Suk Jin Kang
(74) *Attorney, Agent, or Firm* — Christopher & Weisberg, P.A.

(57) ABSTRACT

A two step method for determining restoration cycles for a mesh network includes generating a set of possible restoration cycles, and selecting a subset of low-cost restoration cycles on the network. The cost of a restoration cycle may be based, in part, on the availability of capacity on the link to restore traffic with and/or without interference, and network policy. Enabling the restoration cycles to be determined based on the bandwidth capacity of the restoring link, the flows carried by the other link, and other network policy considerations enables embodiments of the invention to account for traffic class, priority, and other traffic considerations when selecting restoration cycles on the network. Identifying arcs on the network with relatively high cost restoration cycles allows portions of the network to be targeted for increased capacity.

10 Claims, 5 Drawing Sheets

CYCLE-BASED RESTORATION IN MESH NETWORKS UTILIZING BANDWIDTH AND FLOW CONSIDERATIONS

CROSS REFERENCE TO RELATED APPLICATIONS

This application claims the benefit of and claims priority to U.S. Provisional Patent Application. No. 60/451,898, filed Mar. 4, 2003, entitled "Cycle-Based Restoration Algorithm With Bandwidth and Flow Considerations for Mesh Networks: Developing the Objective Function".

BACKGROUND OF THE INVENTION

1. Field of the Invention

The present invention relates to mesh networks and, more particularly, to a method and apparatus for cycle-based restoration in mesh networks.

2. Description of the Related Art

Data communication networks may include various computers, servers, nodes, routers, switches, hubs, proxies, and other devices coupled to and configured to pass data to one another. These devices will be referred to herein as "network devices." Data is communicated through the data communication network by passing data packets (or cells, frames, or segments) between the network devices by utilizing one or more communication links. A particular packet may be handled by multiple network devices and cross multiple communication links as it travels between its source and its destination over the network. A subset of data packets destined to travel between the same end points on a network are referred to as a flow. Multiple flows may be carried by a single communication link.

Communications networks may experience local failure on a link for many reasons. To mitigate against the effect of such failures, it is desirable to be able to restore flows in the network with minimum delays, especially where the flows are associated with traffic of high importance or with revenue producing traffic. One way to restore the flows in the network is to cause the flows to be diverted around the failed area over one or more restoration paths until the area can be repaired.

Restoration paths may be created after a failure is detected utilizing a protocol exchange between network devices involved in handling traffic over the affected link. Unfortunately, protocol exchanges are time consuming. For example, it may take up to 30 seconds to establish a new path through an IP network using an Open Shortest Path First (OSPF) protocol exchange.

Alternatively, restoration paths may be determined ahead-of-time, before a failure takes place, and pre-programmed into the network devices handling the traffic on the network. By pre-programming the restoration paths into the network, a network device that senses a link failure may simply use the alternative restoration path to restore traffic in real time. One example of a network protocol that includes alternate restoration paths is SONET. Specifically, in SONET there are two choices (east/west). If east isn't available, the west choice is utilized. SONET restoration is thus very fast, since there is no need to notify the source to redirect the traffic—it is done by the SONET switch itself.

Networks have evolved since SONET was developed, so that now switches residing in mesh networks are able to choose between many different paths to restore traffic over a failed link. For example, if two nodes A and B are connected by three links, it is possible to set the maximum bandwidth on each link to be 66% and reserve 33% on each link as back-up. In the event that one of the links fails, the 66% traffic from the failed link may be split and passed over the 33% backup capacity on each of the other two links to achieve total restoration over the links.

To designate portions of a mesh network to back up particular links in the mesh, logical restoration rings, referred to herein as p-cycles, are defined. Defining a p-cycle enables the network devices to perform fast link restoration protection without requiring notification of the source or destination nodes. Thus, in a mesh network the working path will be carried over the mesh network, while the restoration path will be carried over the logical ring. Restoration of traffic from a failed arc, however, should not have an unplanned negative impact on traffic which normally uses the restoration path.

Several methods have been developed to attempt to create restoration paths through a mesh network, one of which is to attempt to restore protection cycles (p-cycles). Unfortunately, this method tends to establish back-up paths with many hops (arcs) which results in a less than optimal restoration path. Additionally, p-cycles do not account for flows or bandwidths on the various links used to establish a back-up path. Hence, p-cycles may result in restoring flows across a bottleneck in the network, which either causes additional connectivity displacement in the network or results in an ineffectual restoration of traffic from the failed link.

SUMMARY OF THE INVENTION

The present invention overcomes these and other drawbacks by providing a method of establishing restoration cycles on a mesh network that is able to account for individual flows and bandwidths on arcs in the mesh network. By considering flows and bandwidths over particular arcs or other sections of the network, it is possible to enhance restorability in the network and design redundancy into the network in a more effective manner.

According to an embodiment of the invention, a two step method for determining optimal P-cycles for a mesh network includes generating a set of possible restoration cycles, and selecting a subset of the cycles that optimize restorability links on the network, assuming a single link failure in the network. The subset of cycles may be selected by choosing one or more low-cost restoration cycles for each link to be restored. The cost of the restoration cycle may be based on the availability of capacity on the link to restore traffic with and/or without interference. The cost of the restoration cycle may also be based on network policy, such as whether the cost for the link should be based on the total cost for the entire restoration cycle or the average cost for the restoration cycle. Thus, embodiments of the invention provide flexibility in allowing for selection of which class, type, or priority of traffic to restore and which not to restore, whenever there is not enough capacity for complete restoration.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
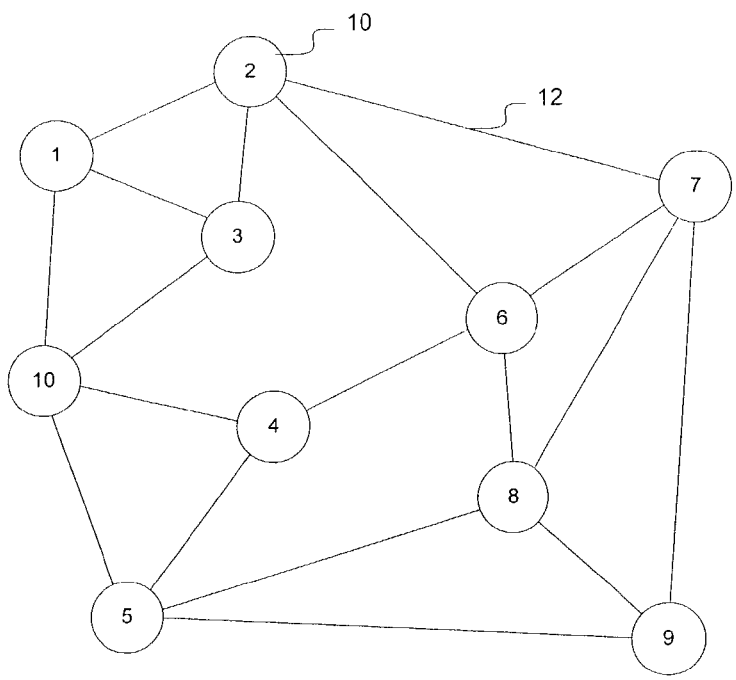
FIGS. 1-5 are network diagrams of mesh network architectures according to embodiments of the invention.

FIG. 1 illustrates an example mesh network G including a set of nodes N (element 10 in FIG. 1) and a set of arcs A (elements 12 in FIG. 1). Nodes N are interconnected by arcs A, although not every node is connected to every other node by a direct arc. The network G will be defined as G={N, A}, where N is the set of nodes and A is the set of arcs of this network. The arcs are undirected.

A(i), (i∈N) will be defined as the set of arcs connected to node i. In the following discussion, it will be assumed that |A(i)|≧2; if this condition is not met there is only one arc connected to node i, thus preventing another arc from being used to restore traffic to node i. Note that when |A(i)|=2, both of the arcs emanating from node i will be part of the restoration cycle for that node.

Several other definitions are also useful to describe the network. Each arc ij has a capacity (bandwidth) $c_{ij}$, with ij belonging to the set A: ij∈A. The network contains a set of source nodes $N_o$ and sink nodes $N_d$, with $N_o$∈N and $N_d$∈N.

$T_{od}$ will be defined as the traffic demand between a pair of nodes od, with o belonging to the set of source nodes (o∈$N_o$) and d belonging to the set of sink nodes (d∈$N_d$). The path used to route traffic from o to d will be defined as $P_{od}$. It is assumed herein that these paths are known. To enable arcs on a particular path to be associated with the path, a quantity $Y_{ij,od}$ is defined as: $Y_{ij,od}$=1 if arc ij is on path from Node o to Node d ($P_{od}$), otherwise $Y_{ij,od}$=0.

Thus, the traffic $f_{ij}$ on a particular arc ij is the sum of the traffic between pairs of source and sink nodes that include that arc on the path between the source and sink nodes: $f_{ij}=\Sigma_{od}T_{od}Y_{ij,od}\leq c_{ij}$. As noted, the traffic on a particular arc must be less than or equal to the capacity $c_{ij}$ for that arc. In a similar fashion a quantity $f_{ij,gh}$ may be defined which represents the total flows which uses both arc ij and arc gh.

According to an embodiment of the invention, a two step method for determining optimal P-cycles for a mesh network includes generating a set of possible restoration cycles, and selecting a subset of low-cost restoration cycles on the network. The cost of a restoration cycle may be based, in part, on the availability of capacity on the link to restore traffic with and/or without interference, and network policy. Enabling the restoration cycles to be determined based on the bandwidth capacity of the restoring link, the flows carried by the other link, and other network policy considerations enables embodiments of the invention to account for traffic class, priority, and other traffic considerations when selecting restoration cycles on the network. As discussed below, by determining the cycles in the network and then selecting cycles which are to be used for restoration based at least in part on the flows on the arcs and the capacity of the arc, it is possible to more selectively and efficiently select restoration cycles in the network to restore high priority or high revenue flows in the event of a failure on the network.

Generating a Set of Possible Restoration Cycles in the Network

A planar graph is a graph in which no arcs cross each other. For any network that can be converted to a planar graph there are methods for determining all the cycles in that network. In this application, it will be assumed that the network is a planar graph, or that it is convertible into a planar graph and has been converted into a planar graph.

Figure 2:
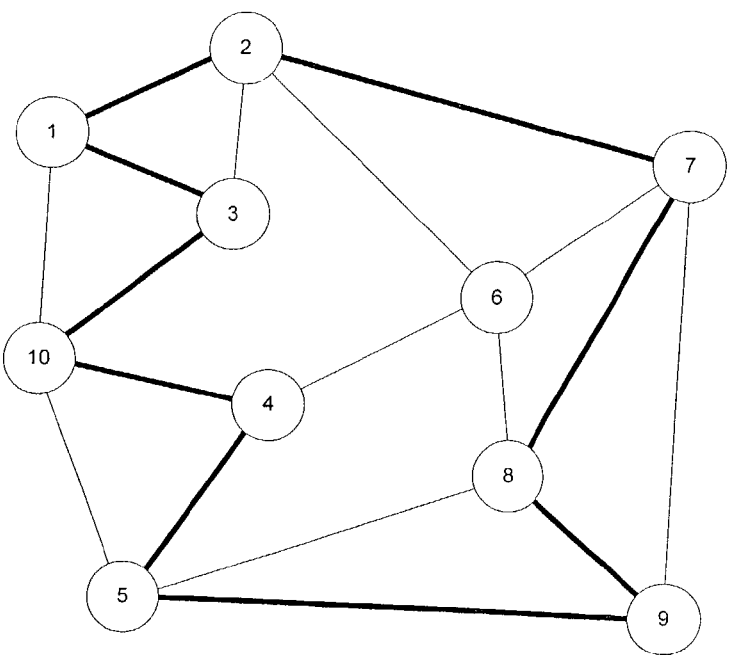

A p-cycle is a pre-configured cycle formed out of spare capacity arcs. A p-cycle is shown in bold lines in FIG. 2. In this example, the p-cycle is 1-2-7-8-9-5-4-10-3-1. This cycle has 9 arcs and 9 nodes on it. In this cycle not all single arc failures are restorable, since only arcs that interconnect nodes on the cycle are restorable. Specifically, as discussed below, only spanning arcs and straddling arcs are restorable. Thus, in the illustrated embodiment, arcs (2,6), (4,6), (6,7) and (6,8) are not restorable since the restoration path does not go through node 6.

Figure 3:
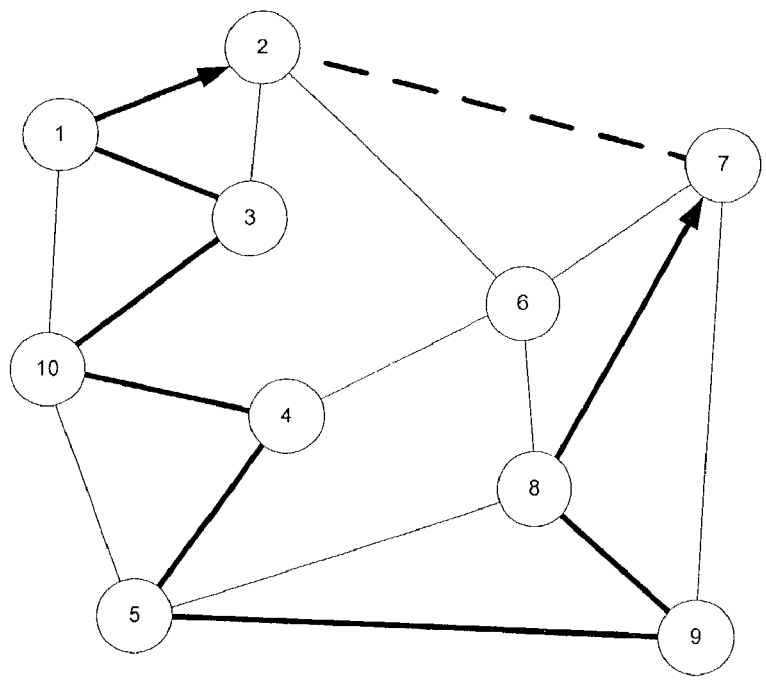

FIG. 3 illustrates an example of a spanning arc failure. As shown in FIG. 3, if a spanning arc on the restoration cycle fails, it can be restored by a single path. In this example, assume that arc (7,2) fails. It can be restored through a single path given as: 7-8-9-5-4-10-3-1-2.

Figure 4:
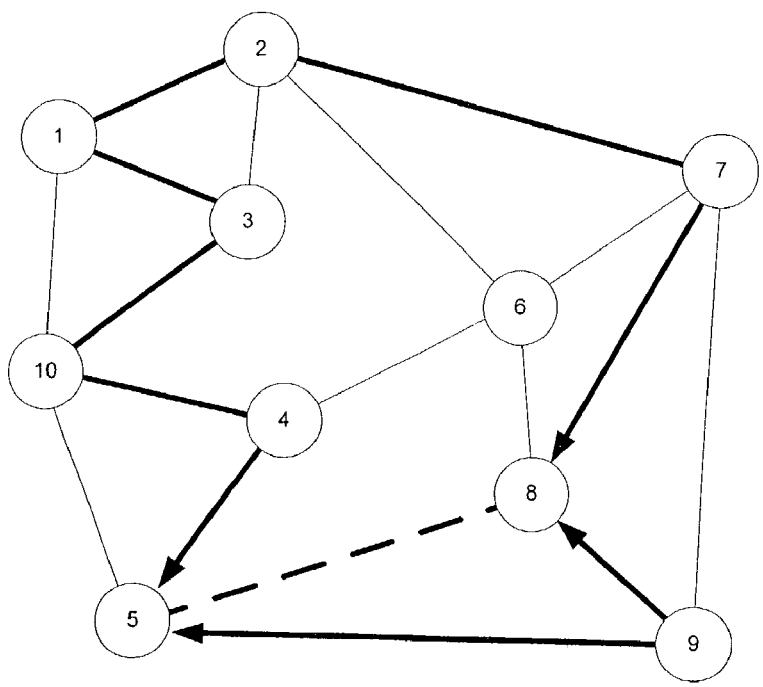

FIG. 4 illustrates an example of an arc failure where the arc is not on the cycle, but straddles the cycle. In the example illustrated in FIG. 4, the straddling arc (8,5) has failed. In this example, the straddling arc (8,5) may be restored via a first path 5-9-8 and via a second path 5-4-10-3-1-2-7-8. As mentioned above, since both nodes on the ends of an arc must be on the p-cycle to restore a failure on that arc, only spanning arcs and straddling arcs are restorable.

One way to avoid excessively large p-cycles is disclosed by Wang, et al., U.S. patent application Ser. No. 09/703,715, the content of which is hereby incorporated herein by reference. In this application, Wang discloses a K-diversity line protection approach wherein an arc (i,j) is said to be K-diverse if there exists at least K disjoint paths from i to j. A set of nodes is then grouped according to the K-diversity category to obtain what is called K-diversity sub-network. A ring topology, for example, is a 2-diversity sub-network.

There are several known methods of generating all possible cycles in a planar graph network. For example, one well-known method was disclosed by Dogrusoz et al., *Enumerating All Cycles Of A Planar Graph*, Journal of Parallel Algorithms and Applications, No. 10, pages 21-36, (1996), the content of which is hereby incorporated herein by reference. In the following discussion it will be assumed that the cycles for a given planar graph network are known.

Selecting a Subset of Cycles

Once the set of cycles has been established, a subset of the cycles to be used for restoration is selected. According to one embodiment of the invention, costs are assigned to each cycle and a subset of cycles is selected to implement network policy to minimize the total cost, average cost, or other considerations, while also attempting to ensure that every arc is restorable upon failure. In the following discussion, the following variables will be used to describe the network and flows on the network:

$X_k$ is a zero-one variable which assumes the value of 1 when cycle k is selected or 0 when it is not $b_k$ is the penalty/cost associated with selecting cycle k $m_k^{ij}$ is the maximum available spare capacity for flows $f_{ij}$ on cycle k when arc ij fails R(ij) is the set of distinct cycles for restoring arc ij and R is the set of all the cycles generated The best set of cycles, given these definitions, should minimize the penalty/costs for selected cycles. This criteria is subject to the condition that the maximum available spare capacity on a given arc must be great than or equal to the traffic flow to be restored over that arc. Stated mathematically:

min $\Sigma_{k \in R} b_k X_k$ s.t. $\Sigma_{k \in R(ij)} m_k^{ij} X_k \geq f_{ij}$, $\forall ij \in A$ $X_k = 0$ or $1$, $\forall k \in R$ According to an embodiment of the invention, $b_j$, and $m_k^{ij}$ are selected to enable network flows to be restored in addition to bandwidths on a link to be restored.

Consider the network $G = \{N, A\}$ and a pair of adjacent nodes i and j such that there exists an arc $ij \in A$. For cycle k let there be $K_{ij}$ diverse routes for this node pair. For each diverse route v let $w_v^k(ij)$, $v=1, 2, \ldots K_{ij}$, be all the arcs along this path (excluding arc ij).

The total amount of traffic which is restorable by cycle k without interference is determined by the arc on the restoration path that has the least unused capacity. Similarly, the amount of traffic that may be restored with interference is determined by the arc on the restoration path with the lowest total capacity. Stated mathematically:

$d_v^k(ij) = \min \{c_{gh} - f_{gh} + f_{gh,ij}\}$, $\forall gh \in w_v^k(ij)$, and $e_v^k(ij) = \min \{c_{gh}\}$, $\forall gh \in w_v^k(ij)$.

If $$d^k(ij) = \sum_{v=1}^{K_{ij}} d_v^k(ij) \text{ and } e^k(ij) = \sum_{v=1}^{K_{ij}} e_v^k(ij),$$

when arc ij fails, then the total amount of traffic that is restorable without interference, is $d^k(ij)$ and the total amount of traffic that is restorable with interference is $e^k(ij)$.

When arc ij fails the maximum available spare capacity for restoration of its flow by all the cycles is $$d_{ij} = \sum_{k \in R(ij)} d^k(ij)$$

without interference and $$e_{ij} = \sum_{k \in R(ij)} e^k(ij)$$

with interference. To account for arcs K-diversity routes, $w^k(ij)$ is defined as the set of all the arcs in all the $K_{ij}$ diversity routes for arc $$ij, \text{ i.e. } w^k(ij) = \bigcup_{v=1}^{K_{ij}} w_v^k(ij).$$

Figure 5:
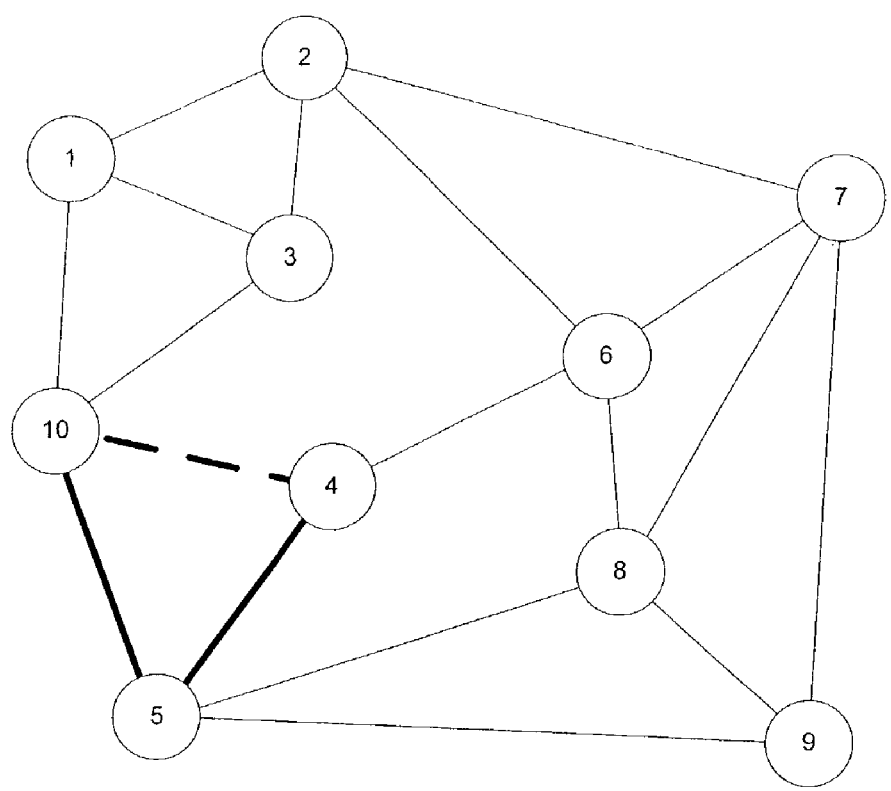

In a p-cycle, a spanning arc ij has only one restoration path, i.e. $K_{ij} = 1$, hence we have $d^k(ij) = d_1^k(ij)$, $e^k = e_1^k(ij)$, and $w^k(ij) = w_1^k(ij)$. However for a straddling arc ij there are two distinct paths, i.e. $K_{ij} = 2$, hence we have $d^k(ij) = d_1^k(ij) + d_2^k(ij)$, $e^k(ij) = e_1^k(ij) + e_2^k(ij)$, and $w^k(ij) = w_1^k(ij) \cup w_2^k(ij)$. For example, assume, as shown in FIG. 5, that a cycle 10-4-5-10 includes three arcs: (10,4), (4,5), and (5,10). If arc (10,4) fails then that arc is only restorable via one path: 4-5-10, i.e. $K_{10,4} = 1$. Two arcs on this path are the critical ones (4,5) and (5,10). Assume, for this example that the arcs have the following capacities and are carrying the following traffic: $c_{4,10} = 10$, $c_{4,5} = 10$, $c_{5,10} = 11$, $f_{4,10} = 9$, $f_{4,5} = 6$, $f_{5,10} = 11$, $f_{4,5:4,10} = 3$, $f_{5,10:4,10} = 4$, then we have $d^G(\mathbf{10,4}) = d_1^G(\mathbf{10,4}) = \min \{10-6+3; 11-5+4\} = 7$ and $e^G(ij) = e_1^G(\mathbf{10,4}) = \min \{10,10\} = 10$. Thus, the maximum amount of traffic on arc (10,4) that is restorable without interference is 7, and the maximum amount of traffic on arc (10,4) that is restorable with interference is 10.

To ascertain the maximum available spare capacity, it is desirable to utilize a portion of the available spare capacity that may be used to restore the flow without interference, and a portion of the capacity that may be used to restore the flow with interference. Equation 1 allows a network manager or other entity to set the amount of each type of capacity to be utilized in the event of failure of a given arc.

$$m_k^{ij} = \alpha_d d^k(ij) + \alpha_e e^k(ij), \ 0 \leq \alpha_d, \alpha_e \leq 1, \ \alpha_e = 1 - \alpha_d. \quad \text{Equation (1)}$$

When $\alpha_d = 1$, restoration traffic will not interfere with any other flows on the cycle, and when $\alpha_d = 0$, restoration traffic will interfere with all flows on the cycle. The choice of $\alpha_d$, and hence $\alpha_e$, is made to implement network policy, such as by a network engineer or network policy software program, and the selection is based on the importance of the traffic on the failed arcs verses the importance of the traffic on the restoring paths. The relative importance may be judged in terms of revenue, traffic class, traffic sensitivity, or numerous other criteria deemed important in administering or establishing the network.

$$\sum_{k \in R(ij)} m_k^{ij} X_k \geq f_{ij}, \ \forall \ ij \in A.$$

One general goal may be able to restore as much traffic as possible. One way of looking at this is to look at the ratios of flows that are restorable and not restorable. The maximum ratios of restorable flows with and without interference ($r_d^k(ij)$ and $r_c^k(ij)$) are defined as: $r_d^k(ij) = \min \{1, d_{ij}/f_{ij}\}$ and $r_e^k(ij) = \min \{1, e_{ij}/f_{ij}\}$. In the example discussed above in connection with FIG. 5, the two ratios are $r_d^k(\mathbf{10,4}) = \min \{1, 7/9\} = 0.778$ and $r_c^k(\mathbf{10,4}) = \min \{1, 10/9\} = 1$, with k=1 in both cases. Similarly, the ratios of flows that are not restorable with and without interference are given as $1_d^k(ij) = 1 - r_d^k(ij)$ and $1_e^k(ij) = 1 - r_e^k(ij)$, respectively.

To determine the total cost of a protection cycle, the cost of each arc on the ring is evaluated. The total cost may include a sum of the costs for all arcs on the ring, an average cost for arcs on the ring, or some combination of the two depending on network policy. To calculate the costs, a quantity $h_k$ is defined as the number of hops on cycle k and let $$w^k = \bigcup_{\forall ij} w^k(ij)$$

be the set of all the arcs on cycle k, including ij, i.e. $|w^k| = h_k$. Depending on what is more important from a design perspective, it may be desirable to minimize the total cost for a given $$\text{cycle } b_k^1 = h_k \sum_{\forall ij \in A} [\alpha_d l_d^k(ij) + \alpha_e l_e^k(ij)],$$

or the average cost for the cycle $$b_k^2 = \sum_{\forall ij \in w^k} [\alpha_d l_d^k(ij) + \alpha_e l_e^k(ij)]/h_k.$$

A weighted sum (Equation 2) is then used to enable a network engineer or other entity to select the relative importance of each cost metric on the particular implementation on the network.

$$b_k = \phi_1 b_k^1 + \phi_2 b_k^2, \ \phi_1 \geq 0, \ \phi_2 \geq 0, \text{ with } \phi_q > 0 \text{ for either } q=1 \text{ or } 2 \text{ or both.} \quad \text{Equation (2)}$$

The ability to select $\phi_1$ and $\phi_2$ provides flexibility in deciding which traffic is to be restored. Specifically, it allows penalty costs to be established based on network policy and allows the penalty costs to be associated with non-restorability of flows on the network. The coefficients could be associated with delay, with penalty costs on partial links, or any other considerations. Additionally, if there is a particular arc that is not to be used to restore traffic, it is simple to select $\phi_1$ and $\phi_2$ such that the cost of going through the link is to high, so that other restoration paths will be preferred to that high cost path.

An additional advantage is that it is now possible to decide, during an arc failure, which traffic flows to restore, which traffic flows not to restore, and which traffic should preempt traffic on otherwise non-failing links. All of this allows more flexibility in designing the network and enables further flexibility in running the network.

Figure 6:
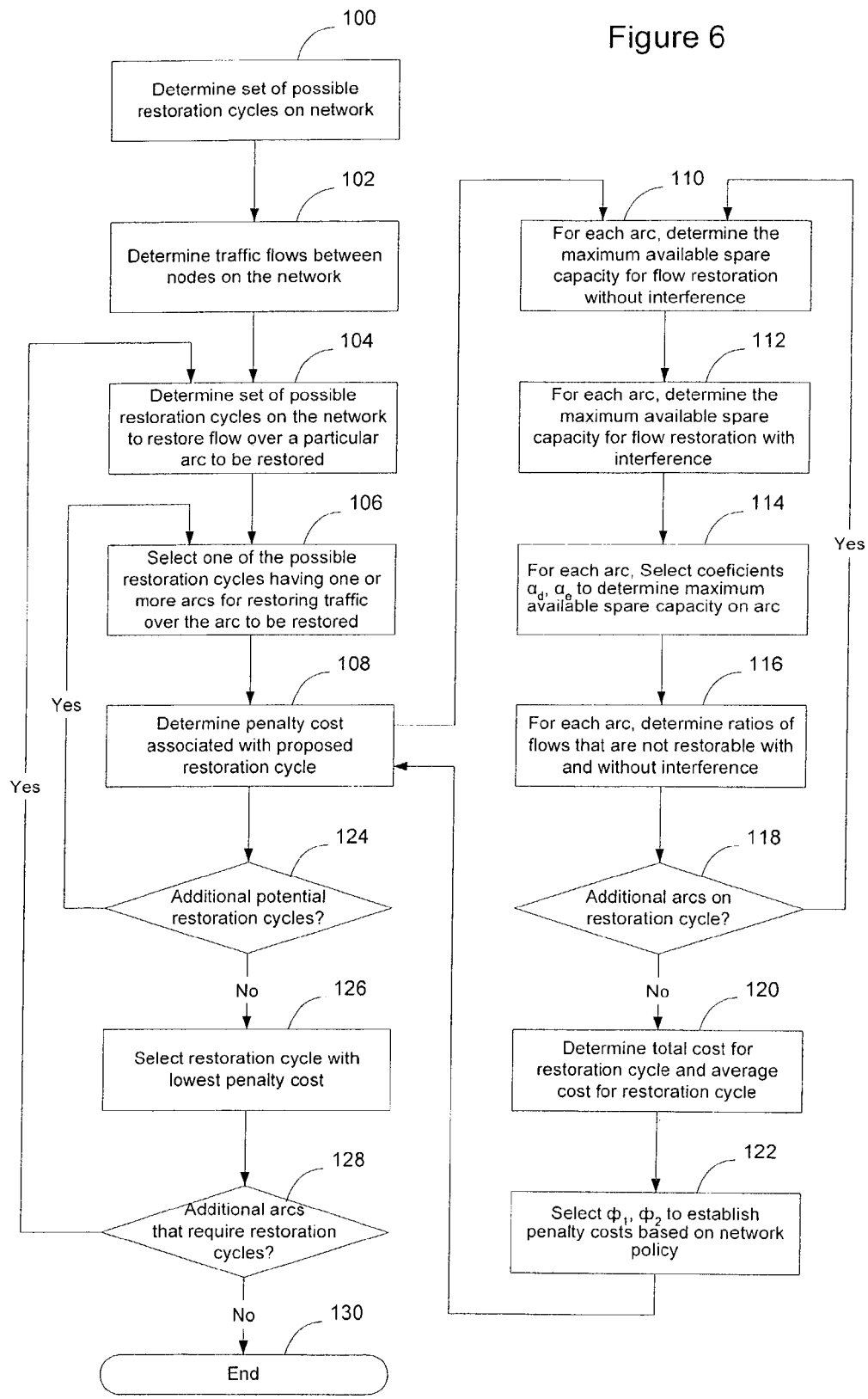
FIG. 6 is a flow chart of an example of software that may be utilized to determine restoration cycles according to an embodiment of the invention.

FIG. 6 illustrates a flow chart of an example of software configured to ascertain a set of restoration cycles in a mesh network. As shown in FIG. 6, initially, the software will determine a set of possible restoration cycles on the network 100. This may be done in any convenient manner, as discussed in greater detail above.

After the set of possible restoration cycles has been ascertained, the software will determine traffic flows between nodes on the network 102. Ascertaining traffic flows between nodes, and optionally the type of traffic flowing between nodes, is useful to enable the software to take the traffic flows into account when ascertaining which arcs on the network have spare capacity and which are carrying traffic that may be preempted. The traffic flow information may contain information useful to the network engineer or other software program configured to set values as to which traffic may be preempted and which traffic should be afforded high priority status.

The software will then look to establish one or more restoration cycles for each of the arcs on the network. The mesh network will carry the traffic in the ordinary course, however the network devices forming the nodes will be configured to protection switch to one or more selected restoration paths upon occurrence of a failure on the arc destined to carry traffic from that node.

Accordingly, for each arc to be restored, the software will determine a set of possible restoration cycles on the network that may be used to restore flow over the particular arc to be restored 104. The set of possible restoration cycles may be determined in any convenient manner, such as by looking for all restoration cycles that include the restored arc as either a spanning arc or a straddling arc. Other methods may be utilized as well, and the invention is not limited to any particular manner of selecting a subset of possible restoration cycles.

The software will then select one of the possible restoration cycles having one or more arcs 106, and determine the penalty cost associated with the proposed restoration cycle 108.

The software, according to one embodiment of the invention, may implement several steps to ascertain the penalty cost of the particular restoration cycle of interest. For example, according to one embodiment of the invention, the software may ascertain, for each arc on the selected restoration cycle, the maximum available spare capacity for flow restoration without interference 110, and the maximum available spare capacity for flow restoration with interference 112. After these values are calculated, the software may obtain coefficients indicative of the amount of available spare capacity with and without interference that is to be used to restore flows over that particular arc 114. These values may be set by a network administrator or network policy software module taking into account the types of traffic on the respective arcs, the relative importance of the traffic, or any other number of criteria.

Once the coefficients have been selected and applied, the software will determine ratios of flows that are not restorable over the arc with and without interference 116. If there are additional arcs on the restoration cycle 118, the software will process each additional arc in a similar manner.

After relevant arcs on the restoration cycle have been evaluated, the software will determine the total cost for the restoration cycle and the average cost for the restoration cycle 120. Coefficients related to how the total cost and average cost are to be used to determine the penalty for the restoration cycle are then applied by the software 122 to enable a network administrator to select which cost metric should be utilized on the network. For example, the network administrator may determine that the total cost for a restoration path is more important than the average cost over the restoration path. Conversely, the network administrator may determine that it is important to maintain a low average cost on arcs on the network. Applying coefficients to enable these trade-offs to be made enables the software to be flexible to take into account network policy while accounting for flows on the network.

Once the penalty cost for a particular restoration cycle has been determined, the software determines if there are any additional potential restoration cycles for the arc to be restored 124. If there are additional restoration cycles to be evaluated, the software will select and evaluate restoration cycles until it has found a restoration cycle with a sufficiently low penalty cost or until it has evaluated all restoration cycles in the set of possible restoration cycles.

When there are no additional restoration cycles to evaluate for restoration of a particular arc, the software will select one or more restoration cycles with acceptable penalty costs as the restoration cycle(s) to be used in the event of failure on the particular arc 126. The software will continue to select restoration cycles for the other arcs on the network 128 until a set of restoration cycles has been established for the network 130.

The determination of restoration paths may also be used proactively during the network design phase or in connection with a network monitoring program, to help determine where to optimally place spare capacity in the network. For example, the software may identify arcs having relatively high penalty cost restoration cycles as candidate areas on the network that could benefit from additional capacity. This enables the network to be designed initially to increase restorability of connectivity between two nodes in the event a connecting arc fails. Likewise, this enables ongoing evaluation of the network to identify bottlenecks in the event of link failure to identify target areas for deployment of additional spare capacity.

Figure 7:
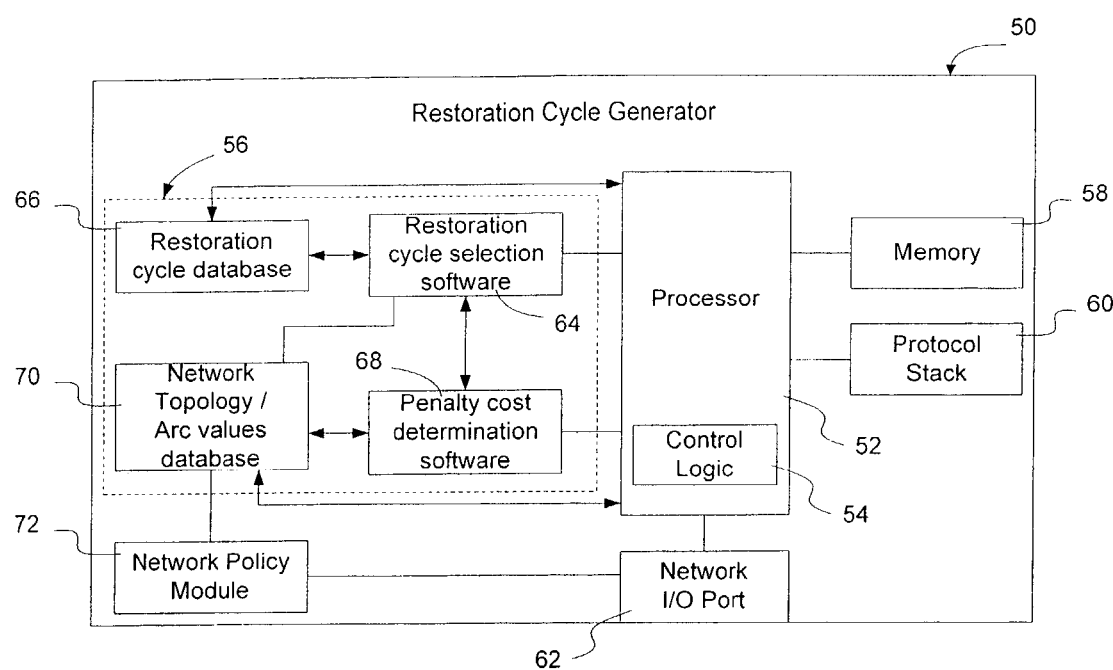
FIG. 7 is a functional block diagram of a network device configured to implement embodiments of the invention.

FIG. 7 illustrates a network device 50 configured to implement a restoration cycle generator according to an embodiment of the invention. As shown in FIG. 7, the network device 50 contains a processor 52 having control logic 54 configured to interface with restoration cycle software 56 to implement the functions and acts described above in connection with FIGS. 1-6.

The network device 50 includes conventional modules, such as a memory 58, and a protocol stack 60 containing instructions and data relevant to common communications protocols to enable the network device 50 to communicate with other network devices over one or more communications ports 62.

The restoration cycle software 56 may have one or modules configured to implement the functions and acts described above in connection with FIGS. 1-6. In the embodiment illustrated in FIG. 7, the restoration cycle software 56 includes a restoration cycle selection software module 64 configured to interface with a restoration cycle database 66 and to select restoration cycles for particular arcs to be restored. In this embodiment, the restoration cycle software 56 also includes a penalty cost determination software module 68 configured to interface with a network topology/arc values database 70 and to ascertain the penalty cost associated with a particular selected restoration cycle.

Optionally, as illustrated in FIG. 7, the restoration cycle selection software module 64 may have access to the arc values database to enable it to input values to the arc values database, such as determined traffic flows on the particular arcs. The network topology/arc values database, with network link topology established by a routing protocol, in this embodiment, also includes coefficients input by a network operator or other network policy program module 72 instantiated on the restoration cycle generator 50. Including network topology in the arc values database enables the restoration cycle generator to plan restoration cycles to account for on dynamic network topology modifications.

The invention is not limited to the particular illustrated embodiment, but rather extends to all embodiments configured to implement the methods of the invention. Accordingly, the software need not be divided into the specific modules illustrated in FIG. 7, as this embodiment was included merely as an illustration of one possible embodiment. Similarly, the databases illustrated may be contained in one database, may be housed by the restoration cycle generator network device, or may be hosted on another network device. The invention is not limited to the particular location or embodiment of the database(s) housing the information for manipulation by the restoration cycle generator. Indeed, if desired, the databases may be stored in memory 58 or in any other convenient location.

The control logic of FIG. 7 may be implemented as a set of program instructions that are stored in computer readable memory 58 within the network device and executed on a microprocessor within the network device. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. For example, the invention has been described as looking at the amount of traffic that is restorable with and without interference, the invention is not limited to this embodiment but also includes embodiments wherein the type of traffic is considered, i.e. high priority traffic utilizes a first set of protection cycles and low priority traffic utilizes a second set of protection cycles. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of establishing a restoration cycle for an arc on a mesh network, the method comprising the steps of:
   determining a set of possible restoration cycles for the arc on the mesh network; and
   selecting at least one restoration cycle from the set of possible restoration cycles based on capacities of arcs on the restoration cycles and flows on the restoration cycles;
   wherein the step of selecting at least one restoration cycle comprises determining a penalty cost associated with each of the possible restoration cycles, and choosing one of said possible restoration cycles with the lowest penalty cost;
   wherein the step of determining the penalty cost on the restoration cycle comprises determining the maximum available spare capacity for flow restoration for a particular arc on the restoration cycle; and
   wherein the step of determining the maximum available spare capacity for flow restoration on the particular arc on the restoration cycle comprises determining the maximum available spare capacity for flow restoration without interference on the particular arc, and determining the maximum available spare capacity for flow restoration with interference on the particular arc.

2. The method of claim 1, wherein the step of determining a set of possible restoration cycles for the arc comprises selecting restoration cycles that include the arc as at least one of a straddling arc and a spanning arc.

3. The method of claim 1, wherein the step of determining the maximum available spare capacity comprises selecting a portion of the maximum available spare capacity for flow restoration without interference on the particular arc, and a portion of the maximum available spare capacity for flow restoration with interference on the particular arc.

4. The method of claim 1, wherein the step of determining the penalty cost comprises determining the maximum available spare capacity for flow restoration for each arc on the restoration cycle.

5. The method of claim 4, wherein the penalty cost comprises a portion of an aggregate penalty cost for each arc on the restoration cycle, and an average penalty cost of all of the arcs on the restoration cycle.

6. The method of claim 1, further comprising the step of:
   identifying an arc having a restoration cycle with a relatively large penalty cost.

7. A computer-readable storage device having embodied therein software configured to generate restoration cycles, said software comprising:
   a restoration cycle selection software module to select at least one restoration cycle for an arc to be restored from a set of possible restoration cycles; and
   a penalty cost determination software module to utilize bandwidth capacity and flow information for arcs on the restoration cycles to calculate penalty costs associated with the restoration cycles; wherein the restoration cycle selection software module selects the at least one restoration cycle from the set of possible restoration cycles based on the calculated penalty costs;
   wherein the penalty cost determination module determines a maximum available spare capacity for flow restoration for each arc on the restoration cycle; and
   wherein the penalty cost determination module determines the maximum available spare capacity of a particular arc on the restoration cycle by determining a maximum available spare capacity for flow restoration without interference on the particular arc, and determining a maximum available spare capacity for flow restoration with interference on the particular arc.

8. The computer-readable storage device of claim 7, wherein the penalty cost determination module determines the maximum available spare capacity for the particular arc by selecting a portion of the maximum available spare capacity for flow restoration without interference on the arc, and a portion of the maximum available spare capacity for flow restoration with interference on the arc.

9. The computer-readable storage device of claim 8, wherein the penalty cost determination module determines the maximum available spare capacity for each arc on the restoration cycle by selecting a portion of the maximum available spare capacity for flow restoration without interference on each arc, and a portion of the maximum available spare capacity for flow restoration with interference on each arc.

10. The computer-readable storage device of claim 9, wherein the penalty cost comprises a portion of a sum of the penalty cost for each arc on the restoration cycle, and a portion of an average penalty cost of each arc on the restoration cycle.

* * * * *